United States Patent
Kondo et al.

(10) Patent No.: US 7,340,552 B2
(45) Date of Patent: *Mar. 4, 2008

(54) BUS CONTROL SYSTEM (75) Inventors: Nobukazu Kondo, Ebina (JP); Seiji Kaneko, Yokohama (JP); Koichi Okazawa, Tokyo (JP); Hideaki Gemma, Hadano (JP); Tetsuya Mochida, Yokohama (JP); Takehisa Hayashi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/642,511

(22) Filed: Dec. 21, 2006

(65) Prior Publication Data

US 2007/0106832 A1    May 10, 2007

Related U.S. Application Data (60) Division of application No. 10/274,881, filed on Oct. 22, 2002, now Pat. No. 7,177,970, which is a continuation of application No. 09/991,925, filed on Nov. 26, 2001, now Pat. No. 6,519,667, which is a continuation of application No. 09/777,960, filed on Feb. 7, 2001, now Pat. No. 6,341,323, which is a continuation of application No. 09/514,351, filed on Feb. 28, 2000, now Pat. No. 6,219,738, which is a continuation of application No. 09/296,660, filed on Apr. 23, 1999, now Pat. No. 6,128,688, which is a continuation of application No. 09/203,621, filed on Dec. 1, 1998, now Pat. No. 5,941,973, which is a continuation of application No. 08/847,974, filed on Apr. 21, 1997, now Pat. No. 5,881,255, which is a continuation of application No. 08/544,727, filed on Oct. 18, 1995, now Pat. No. 5,671,371, which is a continuation of application No. 08/016,692, filed on Feb. 11, 1993, now abandoned.

(30) Foreign Application Priority Data

Feb. 18, 1992  (JP) ............................... 04-030428

(51) Int. Cl.
G06F 13/14      (2006.01)
G06F 13/36      (2006.01)
(52) U.S. Cl. ................. 710/309; 710/305; 710/306
(58) Field of Classification Search ............ 710/305, 710/306, 309
See application file for complete search history.

(56) References Cited

U.S. PATENT DOCUMENTS 3,997,896 A    12/1976   Cassarine, Jr. et al.
(Continued)

FOREIGN PATENT DOCUMENTS

JP    1-161461    6/1989
(Continued)

OTHER PUBLICATIONS

"Futurebus+ P896.1: Logical Layer Specifications", IEEE, 1990, pp. 89-90.
(Continued)

*Primary Examiner*—Mark H. Rinehart
*Assistant Examiner*—Jeremy S Cerullo
(74) *Attorney, Agent, or Firm*—Mattingly, Stanger, Malur, & Brundidge, P.C.

(57) ABSTRACT

In a data processing system, a plurality of modules connected to a system bus thereof are assigned with identifiers. When a source module initiates a split read access to another module, the source module sends an address of the access destination module and an identifier of the source module. When sending a response to the source module, the destination module returns response data and the identifier of the source module thereto. Checking the identifier from the destination module, the source module determines the response data returned as a response to the initiated access.

6 Claims, 12 Drawing Sheets

U.S. PATENT DOCUMENTS

| | | |
|---|---|---|
| 4,128,883 A | 12/1978 | Duke et al. |
| 4,232,366 A | 11/1980 | Levy et al. |
| 4,281,380 A | 7/1981 | DeMesa, III et al. |
| 4,290,102 A | 9/1981 | Levy et al. |
| 4,543,628 A | 9/1985 | Pomfret |
| 4,672,662 A | 6/1987 | Nishino et al. |
| 4,785,394 A | 11/1988 | Fischer |
| 4,797,815 A | 1/1989 | Moore |
| 4,821,174 A | 4/1989 | Webb et al. |
| 4,941,088 A | 7/1990 | Shaffer et al. |
| 4,953,072 A | 8/1990 | Williams |
| 5,001,625 A | 3/1991 | Thomas et al. |
| 5,146,597 A | 9/1992 | Williams |
| 5,191,649 A | 3/1993 | Cadambi et al. |
| 5,235,684 A | 8/1993 | Becker et al. |
| 5,237,567 A | 8/1993 | Nay et al. |
| 5,274,787 A | 12/1993 | Hirano et al. |
| 5,341,495 A | 8/1994 | Joyce et al. |
| 5,379,384 A | 1/1995 | Soloman |
| 5,388,224 A | 2/1995 | Maskas |
| 5,414,820 A | 5/1995 | McFarland et al. |
| 5,483,642 A | 1/1996 | Okazawa et al. |
| 5,594,880 A | 1/1997 | Moyer et al. |
| 6,128,688 A | 10/2000 | Kondo et al. |
| 6,219,738 B1 * | 4/2001 | Kondo et al. ............... 710/311 |
| 6,584,538 B2 | 6/2003 | Kondo et al. |

FOREIGN PATENT DOCUMENTS

| | | |
|---|---|---|
| JP | 3-102558 | 4/1991 |
| JP | 3-222543 | 10/1991 |
| JP | 3-278156 | 12/1991 |

OTHER PUBLICATIONS

J.A. Gallant, "Futurebus+", EDN, Oct. 1, 1990, pp. 87-98.

J. Cantrell, "Futurebus+ Cache Coherence"; WESCON '89 Conference Record, Nov. 14-15, 1989, pp. 602-607.

Langendoen et al, "Evaluation of Futurebus Hierarchical Caching", vol. 1, PARLE '91—Parallel Architectures and Language Europe, 1991, pp. 52-68.

M. Azimi et al, "Design and Analysis of a Hierarchical Snooping Cache Coherence System", Proceedings of the 27th Annual Allerton Conference on Communication, Control and Computing, vol. 1, 1988, pp. 109-118.

* cited by examiner

BUS CONTROL SYSTEM

CROSS-REFERENCES

This is a divisional application of Ser. No. 10/274,881, filed Oct. 22, 2002, now U.S. Pat. No. 7,177,970 which is a continuation application of U.S. Ser. No. 09/991,925, filed Nov. 26, 2001, now U.S. Pat. No. 6,519,667; which is a continuation application of U.S. Ser. No. 09/777,960, filed Feb. 7, 2001, now U.S. Pat. No. 6,341,323 B2; which is a continuation application of U.S. Ser. No. 09/514,351, filed Feb. 28, 2000, now U.S. Pat. No. 6,219,738; which is a continuation application of U.S. Ser. No. 09/296,660, filed Apr. 23, 1999, now U.S. Pat. No. 6,128,688; which is a continuation of U.S. Ser. No. 09/203,621, filed Dec. 1, 1998, now U.S. Pat. No. 5,941,973; which is a continuation application of U.S. Ser. No. 08/847,974, filed Apr. 21, 1997, now U.S. Pat. No. 5,881,255; which is a continuation application of U.S. Ser. No. 08/544,727, filed Oct. 18, 1995, now U.S. Pat. No. 5,671,371; which is a continuation application of U.S. Ser. No. 08/016,692, filed Feb. 11, 1993, now abandoned.

BACKGROUND OF THE INVENTION

The present invention relates to a bus control system for use in a data processing apparatuses such as a personal computer and a work station, and in particular, to improvement of a bus control system supporting a so-called split transfer protocol in which between a start cycle of an access operation of a processor and a response cycle for the access operation from an input/output (I/O) device related thereto, it is possible to insert on an identical bus a start cycle of an access operation of another processor.

As a bus like a conventional system bus, there has been used in many cases a bus supporting the split transfer protocol, for example, as described in "Futurebus+, P896.1, Logical Layer Specifications" (1990, IEEE). This is because that the utilization efficiency and the response time of the bus are improved.

Figure 15:
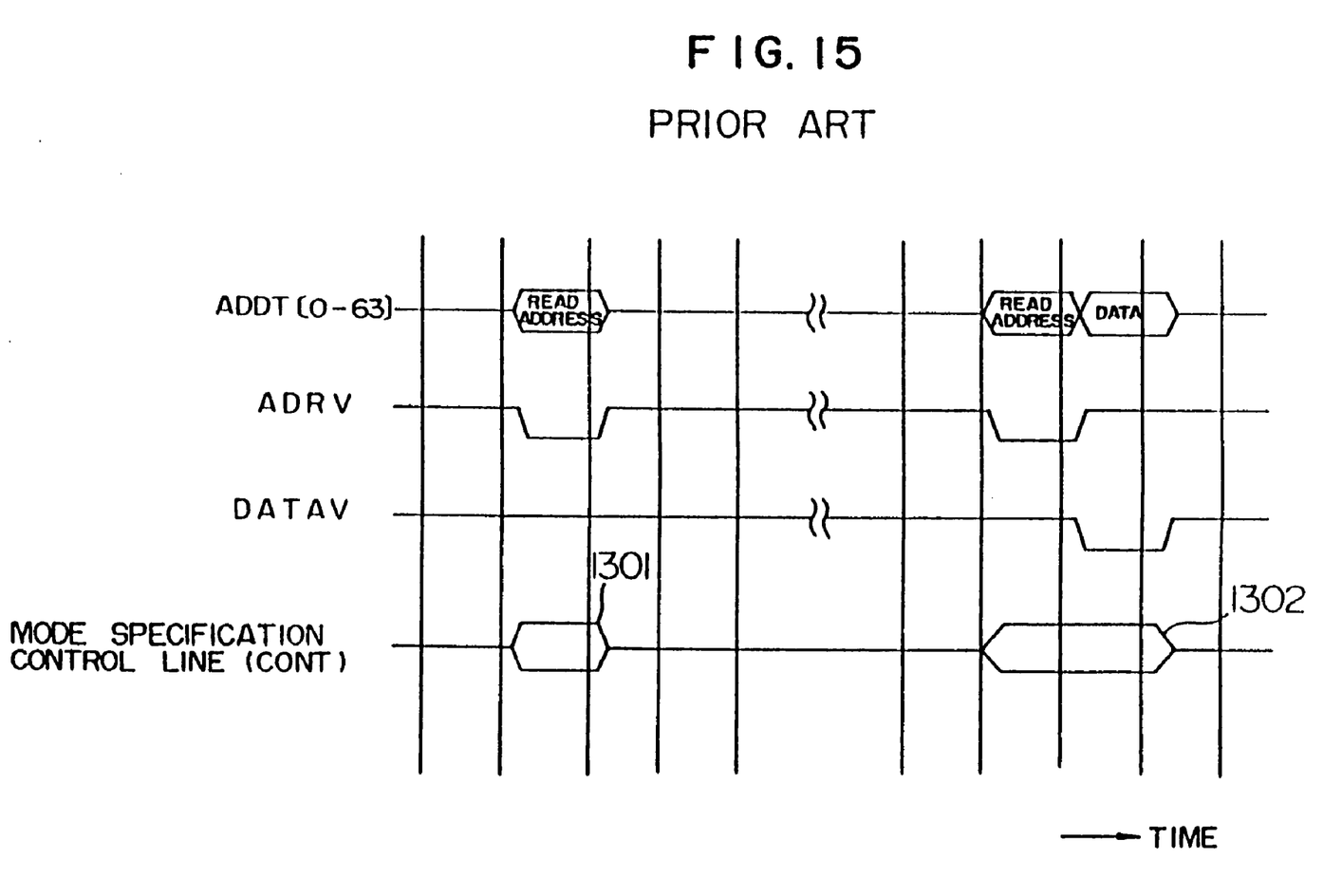
FIG. 15 is a signal timing chart showing the operation of a conventional bus control system.

FIG. 15 shows an example of a typical timing of the split transfer protocol. In this chart, ADDT[0-63] stands for an address/data bus on which 8-byte (64-bit) addresses and data are multiplexed, ADRV denotes an address valid signal indicating that an effective address is being outputted onto the bus ADDT, and DATAV designates a data valid signal indicating that an effective data item is being outputted onto the bus ADDT.

Referring to FIG. 15, description will be given of a conventional read and access operation to obtain data. First, a module (for example, a processor) initiating a read access operation acquires a bus mastership of the bus ADDT. The module then enables the signal ADRV and outputs an address specifying a module to be accessed onto the bus ADDT. At the same time, the initiating module notifies that the access being initiated is a split read access to the destination module (for example, a bus adapter connected to a plurality of I/O devices) via a mode specification control signal line CONT (at a timing 1301 of FIG. 15). Thereafter, the source module renounces or releases the bus mastership to terminate the start cycle.

On the other hand, the destination module designated by the address obtains the mastership of the bus ADDT when read data becomes ready for the access. The destination module then enables the signal ADRV and sends an address specifying a module to be accessed onto the bus ADDT. That is, it is to be noted that the same address is outputted onto the bus ADDT from the source and destination modules.

Simultaneously, the initiating module reports the terminating module via the line CONT that the access being initiated is a response to the split read access (at a timing 1302 of FIG. 15). Subsequently, the data valid signal DATAV is enabled and an effective data item is outputted onto the bus ADDT[0-63]. The destination module then releases the bus mastership and terminates the response cycle.

The source module checks the contents on the line CONT and the access destination address on the bus ADDT to determine that the data is sent in response to the initiated access operation so as to get the response data.

However, as above, in a case where there is disposed a cycle in which the access destination address is outputted onto the bus ADDT when the response data is transferred in response to a split read access, the ratio of busy time of the bus in which the bus is being occupied for operation is increased. Recently, there has been an increase in the number of systems in which, also for minimization of the size and price, the number of signal lines of the bus is decreased, particularly, address and data lines are multiplexed in the bus. In such a multiplex bus, the increase in the busy ratio of bus is an essential problem because of deterioration in the bus utilization efficiency and increase in the response time.

Moreover, due to the recent growing volume of data to be processed, the number of address lines is also increased. In consequence, according to the method above, there exists a problem that the number of flip-flop circuits to keep therein addresses specifying access destination items is increased and hence the hardware system of each module becomes to be more complex.

SUMMARY OF THE INVENTION

It is therefore an object of the present invention to provide a bus control system capable of improving the utilization efficiency of the system bus and decreasing the response time to an access.

In order to achieve the object above, according to the present invention, each module connected to a bus is assigned with an identifier (ID) as identification thereof such that a module initiating an access operation outputs in a start or initiation cycle an address of the access destination onto the bus and an identifier of the initiating module onto a module identifier transfer line disposed as a separate line with respect to the bus, thereby notifying the address and the identifier to the module of the access destination. In response thereto, the destination module sends data onto the bus and an identifier of the initiating module onto the module identifier transfer line, thereby transmitting the data and the identifier to the initiating module.

Furthermore, even when the system includes a plurality of buses configured in a hierarchic structure, there is only a need to assign an identifier to each bus adapter (B/A) disposed between the buses to establish interface therebetween.

In addition, if necessary, an identifier may be similarly assigned to each module connected to the bus in each hierarchic layer. In this case, even when a plurality of modules connected to a hierarchic layer initiate access operations to modules connected to buses in other layers in a sequential manner with respect to time, the bus adapter related to the initiating modules can appropriately distribute response data items to the respective modules based on the identifiers thereof. Namely, in a multimedia system, each processor can output an I/O access onto an identical system bus in a concurrent fashion; consequently, the response time is minimized for an access request on the system bus.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Figure 1:
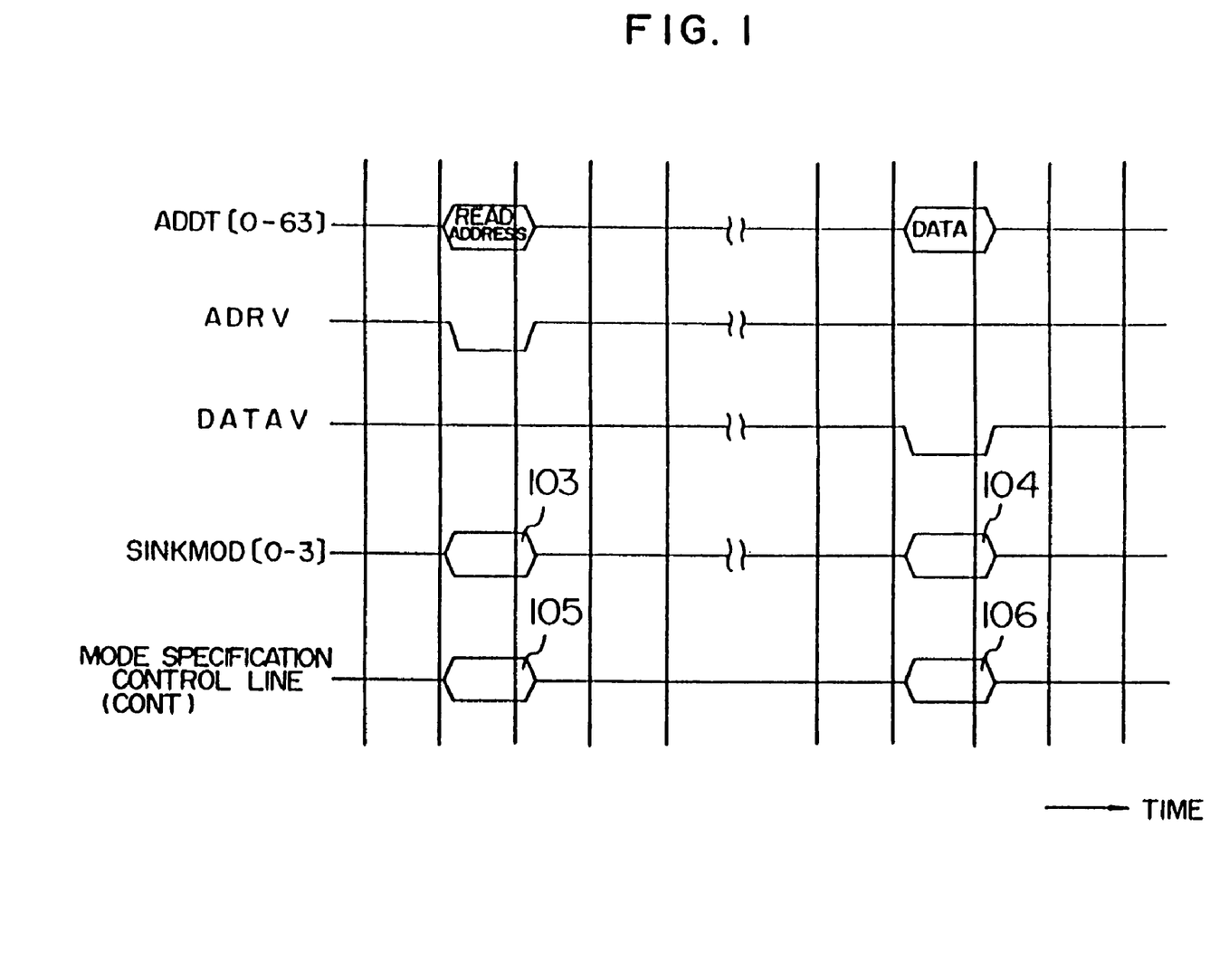
FIG. 1 is a signal timing chart for explaining the operation of a bus control system according to the present invention.

FIG. 1 shows timings of signals in a split read access in the bus control system according to the present invention. As can be seen from FIG. 1, according to the present invention, a cycle is not necessary in which an address of an access destination outputted from an initiation module at an issuance of an access request is returned in response to the access initiation from a module of the access destination onto the bus ADDT. In place of this operation, the destination module outputs an identifier of the initiating module onto a module identifier transfer line in the response operation.

Referring now to FIG. 1, description will be first given of the start or initiation cycle of the source module. Like in the case of FIG. 15 showing the conventional operation, after obtaining the mastership of the bus ADDT, the source module enables the address valid signal ADRV and outputs the address of the access destination module onto the bus ADDT, thereby specifying the destination module. At the same time, the initiating module notifies that the access being initiated is a split read access via a mode specification control signal line CONT to the destination module (at a timing 105 of FIG. 1). Moreover, simultaneously, the source module transmits an identifier thereof via a module identifier transfer line SINKMOD[0-3] to the source module (at a timing 103 of FIG. 1). Thereafter, the source module releases the mastership of the bus ADDT to terminate the start cycle.

On the other hand, the destination module having received the split read access issues a request for the bus mastership when a read data item to be sent to the source module is ready for transmission. On acquiring the mastership, the destination module enables the data valid signal DATAV and outputs an effective read data item onto the bus ADDT[0-63]. Simultaneously, the destination module notifies that the transfer data being returned is a reply to the split read access to the source module via the line CONT (at a timing 106 of FIG. 1). Moreover, at the same time, the destination module outputs the identifier of source module via the line SINKMOD[0-3] to the source module (at a timing 104 of FIG. 1).

Thereafter, the destination module releases the mastership of the bus ADDT to finish the response cycle.

The initiating module checks information sent from the destination module, namely, the mode specification control signal and the identifier of the source module on the line SINKMOD to determine an answer to the access issued therefrom. As a result, the initiating module obtains the response data.

Figure 2:
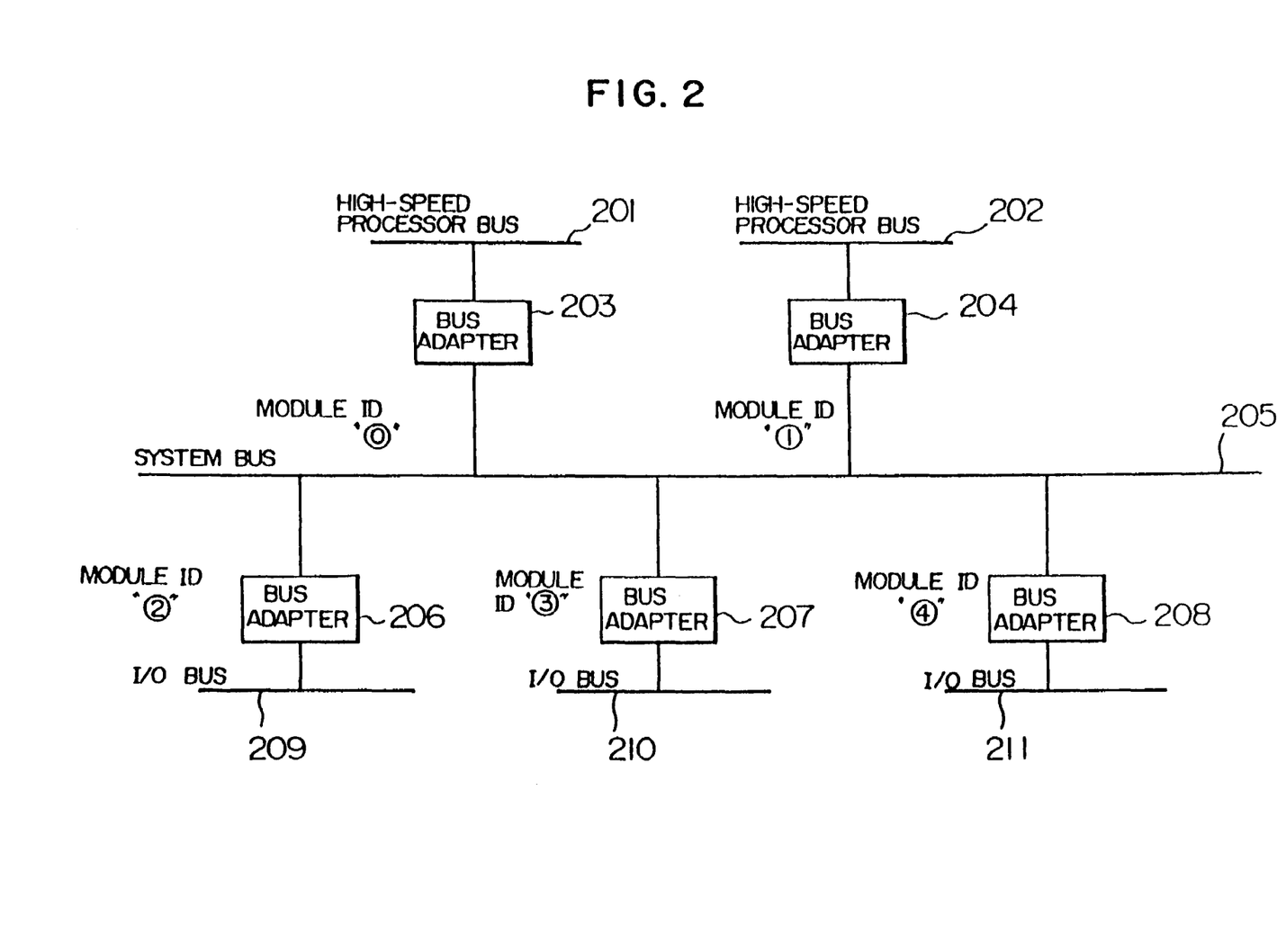
FIG. 2 is a schematic diagram showing the configuration of a data processing system in a first embodiment to which the bus control system is applied according to the present invention.

In FIG. 1, since the line SINKMOD[0-3] is constituted with four bits, mutually different identifiers can be assigned up to 16 modules in the data processing system (for example, an identifier "3" is represented as "0011" in the binary notation). In FIG. 2, there is shown an example in which the modules of the data processing system are assigned with identifiers.

FIG. 2 is a diagram showing the construction of a data processing system in a first embodiment to which the bus control system is applied according to the present invention. In this diagram, the data processing system has a plurality of system buses disposed in a hierarchic structure and a plurality of bus adapters arranged therebetween with identifiers assigned respectively thereto. That is, the system includes high-speed processor buses 201 and 202, a system bus 205, and I/O buses 209 to 211. In this regard, these buses are collectively called a bus in this specification.

Reference numerals 203 and 204 respectively designate bus adapters as interface units between the system bus 205 and the high-speed processor buses 201 and 202 to transfer data therebetween. Numerals 206 to 208 respectively denote bus adapters for establishing interface between the system bus 205 and the I/O buses 209 to 211 to transfer data therebetween. In this embodiment, the bus adapters 203, 204, 206, 207, and 208 are assigned with identifiers "0", "1", "2", "3", and "4", respectively.

Figure 3:
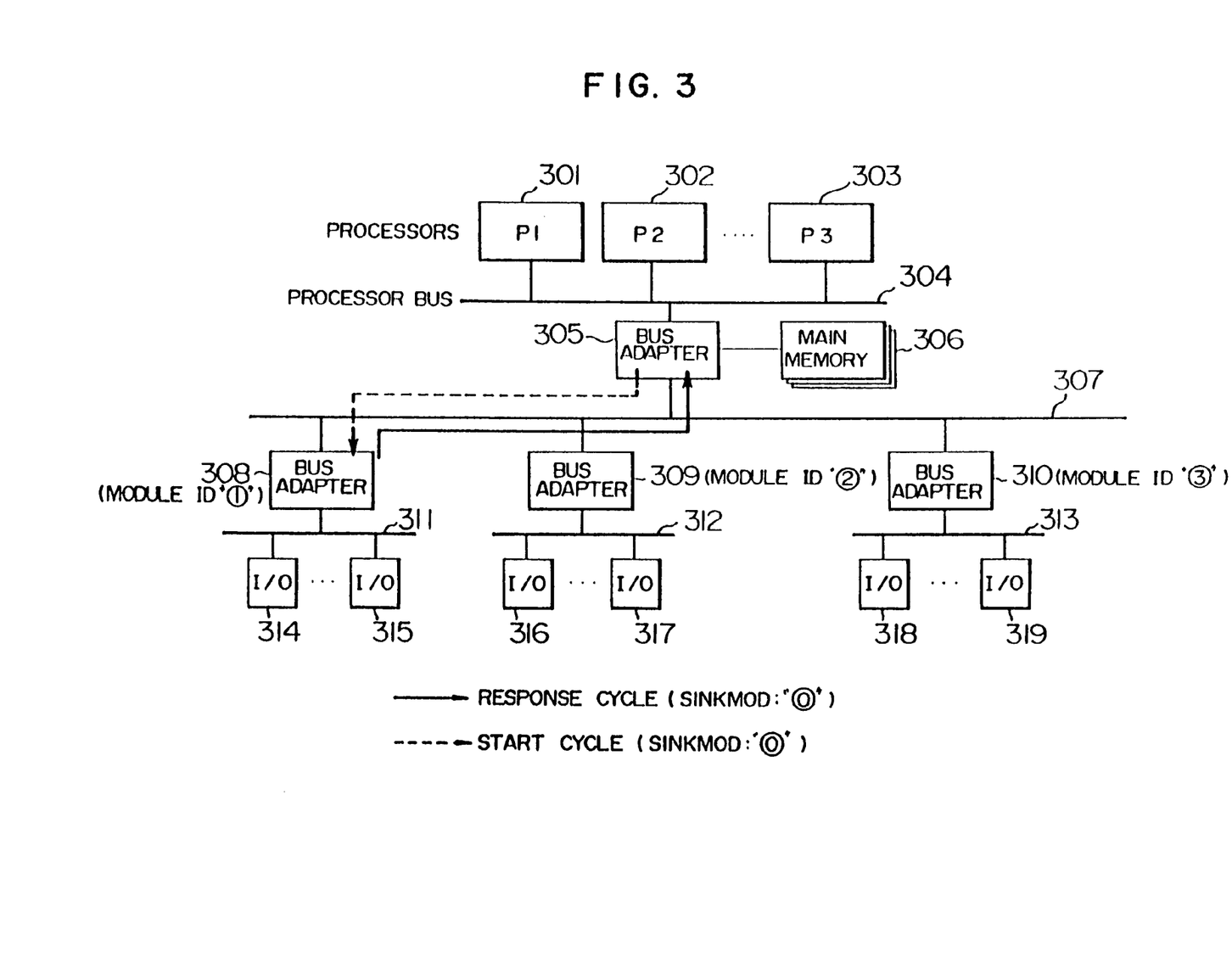
FIG. 3 is a diagram useful to explain flows of data in the data processing system of FIG. 2.

The embodiment shown in FIG. 2 is generally implemented in many cases in a system configuration in which a plurality of processors are connected to a single high-speed processor bus. FIG. 3 shows flows of data in which the bus control system of FIG. 1 according to the present invention is applied to the data processing system of FIG. 2. In this example, a bus adapter 305 is utilized as an initiating module; whereas, a bus adapter 308 is employed as a destination module. The constitution of FIG. 3 includes processors P1 301, P2 302, and P3 303, a processor bus 304 associated with a multiprocessor, a system bus 307, and I/O buses 311 to 313. These buses will be collectively called a bus. There is also included a bus adapter 305 as an interface unit between the system bus 307 and the processor bus 304. A reference numeral 308 denotes a bus adapter for conducting an interface function between the system bus 307 and the I/O bus 311. Numeral 309 denotes a bus adapter as an interface unit between the system bus and the I/O bus 312. Reference numeral 310 designates a bus adapter for establishing interface between the system bus 307 and the I/O bus 312. Numerals 314 and 315 indicate I/O buses connected to the I/O bus 311, numerals 316 and 167 are I/O devices linked with the I/O bus 312, and numerals 318 and 319 designate I/O devices coupled with the I/O bus 313.

In this construction, in accordance with the idea related to FIG. 2, the bus adapters 305, 308, 309, and 310 are regarded as modules to be assigned with identifiers "0", "1", "2", and "3", respectively.

In FIG. 3, assume that the processor P1 issues a read request to the I/O device 314. The bus adapter 305 then starts initiating operation of a split read access to output an address of the I/O device as the access destination onto the system bus 307 corresponding to ADDT[0-63] shown in FIG. 1. At the same time, an address valid signal ADRV, not shown in FIG. 3, is enabled to output a signal notifying a start cycle of the split read access onto a mode specification control line CONT, not shown in FIG. 3. Simultaneously, the bus adapter 305 outputs the identifier "0" ("0000" in the binary representation) of the source module onto an identifier transfer line SINKMOD [0-3], not shown in this diagram.

The bus adapter 308 as the access destination module connected to the system bus 307 transmits the split read request from the source module to the I/O device 314. On receiving a response thereto from the I/O device 314, the bus adapter 308 sends data associated with the split read access from the initiating module to the system bus 307 corresponding to ADDT[0-63] shown in FIG. 1. At the same time, the bus adapter 308 enables the signal ADRV and outputs a signal indicating a response cycle of the split read access to the line CONT. Simultaneously, the bus adapter 308 transmits the identifier "0" ("0000" in the binary representation) of the source module onto the line SINKMOD[0-3].

Checking the identifier on the line SINKMOD [0-3], the initiating module 305 recognizes that data on the system bus 307 is response data of the split read access initiated by the module 305 and then causes the data to be sent onto the processor bus 304 so as to pass the data to the processor 301 having issued the read request.

In the diagram of FIG. 3, a broken line indicates a flow of data in the start cycle achieved by the source module 305, whereas a bold line designates a flow of data in the response cycle effected by the destination module 308.

Figure 4:
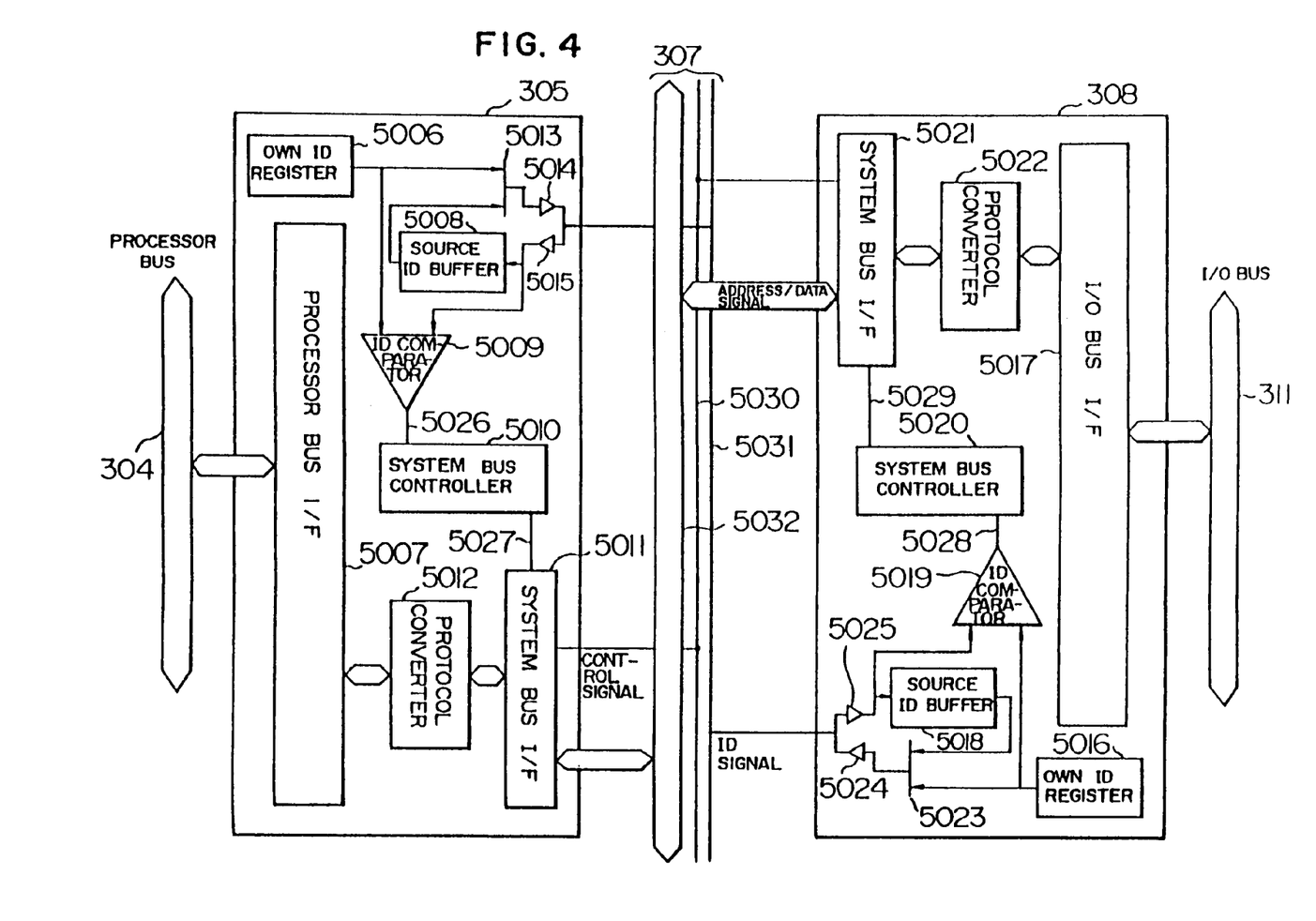
FIG. 4 is a diagram schematically showing a bus adapter in the data processing system of FIG. 3.

FIG. 4 shows specific configurations respectively of the bus adapters 305 and 308.

In FIG. 4, the construction includes a bus adapter 305 for achieving a protocol conversion between the processor bus 304 and the system bus 307 and a bus adapter 308 to conduct a protocol conversion between the system bus 307 and the I/O bus 311.

The bus adapter 305 includes an own ID register 5006 for keeping therein an identifier ID ("0" in the case of FIG. 3) inherent to the bus adapter 305, a processor bus interface unit 5007, a source ID buffer 5008 for keeping therein an identifier ID of a module initiating a read request, an ID comparator 5009 for comparing an identifier flowing through the system bus 307 with the own identifier, a system bus controller 5010, a system bus interface unit 5011, a protocol converter 5012 between the processor bus 304 and the system bus 307, a selector 5013, an identifier signal output buffer 5014, and an identifier signal input buffer 5015.

The bus adapter 308 includes an own ID register 5016 for keeping therein an identifier ID ("0" in the case of FIG. 3) uniquely assigned to the bus adapter 308, a processor bus interface unit 5017, a source ID buffer 5018 for keeping therein an identifier ID of a module initiating a read request, an ID comparator 5019 for comparing an identifier flowing through the system bus 307 with the own identifier, a system bus controller 5020, a system bus interface unit 5021, a protocol converter 5022 between the system bus 307 and the I/O bus 311, a selector 5023, an identifier signal output buffer 5024, and an identifier signal input buffer 5025.

In this regard, reference numerals 5026 to 5029 stand for control lines, numeral 5030 indicates a control signal line of the system bus 307, a numeral 5031 is an identifier transfer line of the system bus 307, and numeral 5032 is an address/data line of the system bus 307.

Next, the operation of the bus adapter 305 will be described.

The bus adapter 305 simultaneously outputs an address for a read operation to the line 5032 and the value of the own ID register 5006 to the line 5031.

The bus adapter 308 invoked by the bus adapter 305 acquires the address and then initiates accessing an I/O device (the device 314 in the case of FIG. 3) on the side of the I/O bus 311 and simultaneously stores, in the buffer 5018, the source ID on the identifier transfer line 5031 of the system bus.

Reading data from the I/O device via the I/O bus 311, the bus adapter 308 returns the data onto the line 5032 of the system bus 307. Simultaneously, the adapter 308 transmits the value of the source ID buffer to the line 5031.

After initiating the read operation, the adapter 305 causes the comparator 5009 to continuously compare the identifier on the line 5031 and the value of the own ID register 5006. Only in a data cycle when the identifiers match each other, the adapter 305 acquires the response data from the interface unit 5011.

As above, thanks to the construction shown in FIG. 1, the bus control of FIG. 1 according to the present invention can be achieved in the data processing system of FIG. 3.

In this regard, as can be seen from FIG. 4, each of the bus adapters of FIG. 3 may be configured in substantially the same manner and hence can be manufactured in a large scale integration.

In the system of FIG. 3, the processors P1 to P3 connected to the bus 304 can issue read requests to any I/O devices in an independent manner. Consequently, there occurs a case where a plurality of processors issue almost at the same time read requests to the associated access destination modules via the bus adapter 305. In this case, since the access response time varies between the I/O devices, the first-in-first-out logic does not hold, namely, data first returned to the adapter 305 is not necessarily associated with the processor that first issued the read request. If an I/O bus (for example, the bus 311) as an access destination supports the split transfer, when a response from an I/O device having a shorter access response time is returned earlier than a response from an I/O device which is accessed prior to the I/O device and which is connected to the same I/O bus, the adapter cannot determine, only from the identifiers from the source modules, whether or not the response data items are returned in accordance with the access order for the following reason. Namely, all of the responses to the split read accesses issued from the bus adapter 305 as the source module have a source identifier "0". In other words, when a bus other than the system bus supports a split transfer protocol similar to that of the prior art, in order to guarantee the appropriate sequence of response data items from the I/O devices, it is necessary for each bus adapter to issue only one read request at a time. This leads to a problem of a long access response time when read requests are to be issued via a single bus adapter to I/O devices.

Figure 5:
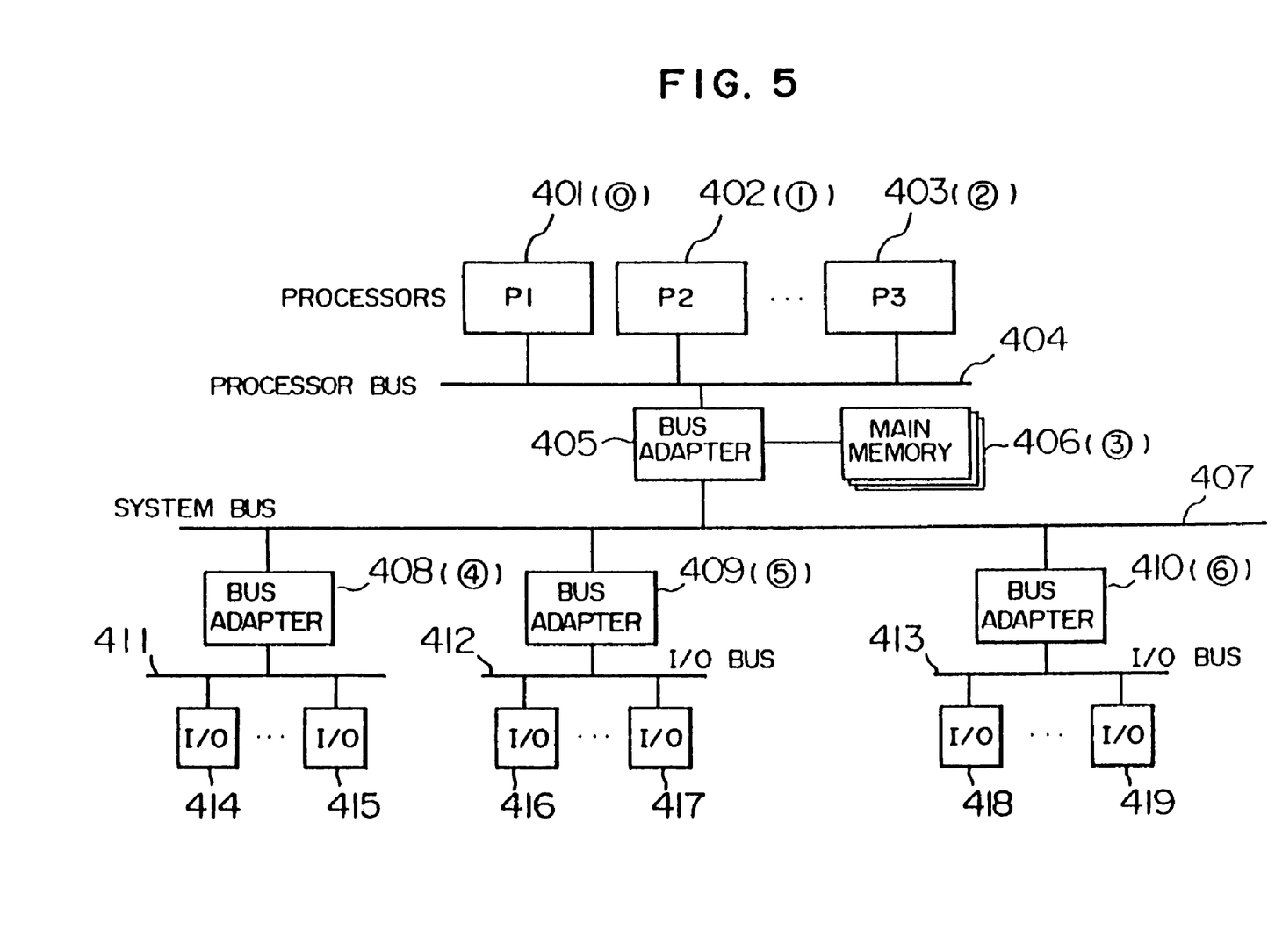
FIG. 5 is a schematic diagram showing the constitution of a data processing system in a second embodiment to which the bus control system is applied according to the present invention.

In the second embodiment shown in FIG. 5, the problem above is solved so that the I/O accesses of the respective processors are issued to the system bus.

FIG. 5 shows a data processing system to which the present invention is applied. The configuration of FIG. 5 includes processors P1 401, P2 402, and P3 402, a processor bus 404 associated with a multiprocessor, a bus adapter 405 for establishing interface between the processor bus 404 and the system bus 407, a main memory 406, a bus adapter 408 for establishing interface between the system bus 407 and the I/O bus 411, a bus adapter 409 for achieving an interface function between the system bus 407 and the I/O bus 412, a bus adapter 410 as an interface unit between the system bus 407 and the I/O bus 413, I/O devices 414 and 415 connected to the I/O bus 411, and I/O devices 418 and 419 linked with the I/O bus 413.

In FIG. 5, there are shown four bus adapters. In this embodiment, an identifier transfer line, not shown, is constructed in four-bit structure. Namely, up to 16 modules can be logically identified. In this constitution, the processors P1 to P3, the main memory 406, and the bus adapters 408 to 410 are assigned with identifiers "0", "1", "2", "3", "4", "5", and "6", respectively. The bus adapter 405 not having any identifier receives I/O access requests from the processors 401 to 403 to issue at most one I/O request onto the system bus 407 for each processor.

Assume in FIG. 5 that the processors P1, P2, and P3 issue in this order via the bus adapter 405 read requests to mutually different I/O devices connected to the I/O bus 411. Moreover, the I/O devices respectively accessed by the processors P3, P2, and P1 respectively have access response speeds arranged in a descending order thereof. Namely, the processors P3 and P1 have the highest and lowest response speeds, respectively.

In this case, the bus adapter 405 initiates, for the bus adapter 408, the split read accesses respectively of the processors P1, P2, and P3 in this order and sends at the same time the identifiers "0", "1", and "2" via the line SINKMOD [0-3] to the bus adapter 408.

Figure 6:
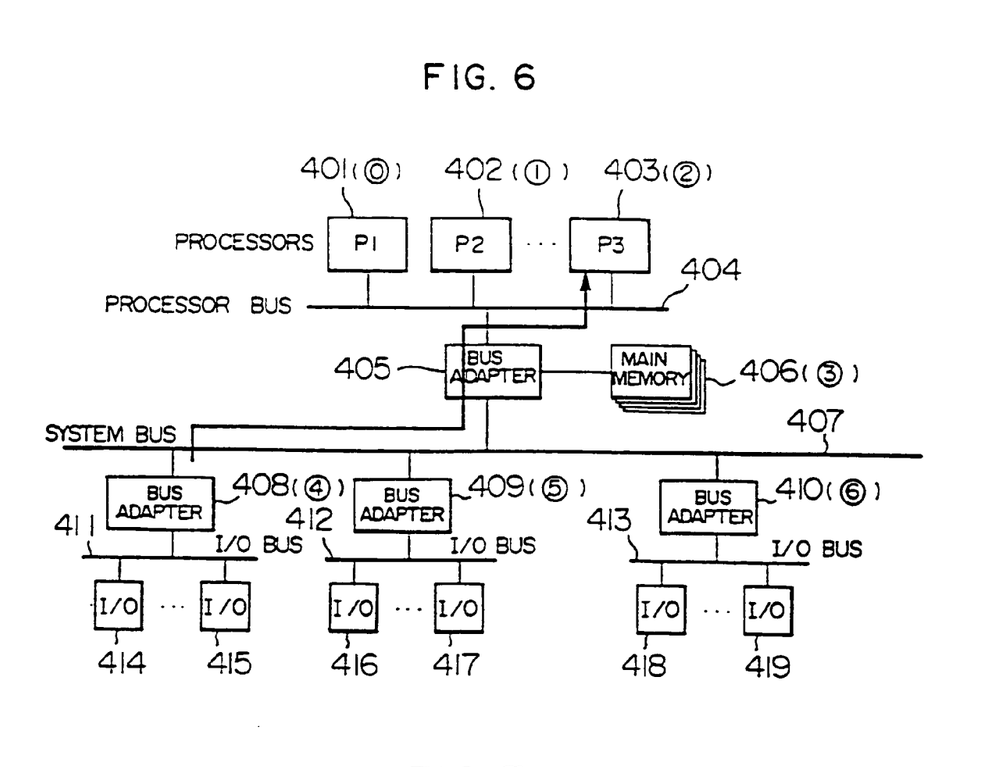
FIGS. 6 to 9 are diagrams for explaining flows of data in the data processing system of FIG. 5.

The bus module 408 awaits, after accessing three I/O devices related thereto, responses from these I/O devices. Since the I/O device associated with the read request from the processor P3 sends the first response, the bus adapter 408 adds the source identifier "2" to the response data from the I/O device to send the resultant data to the system bus 407. Checking the identifier on the line SINKMOD of the system bus 407, the bus adapter 405 detects the source identifier "2" and recognizes that the identifier is assigned to the processor P3 related to the adapter 405, thereby passing the response data to the processor P3. The response data is transferred as indicated by a solid arrowheaded line in FIG. 6.

Figure 7:
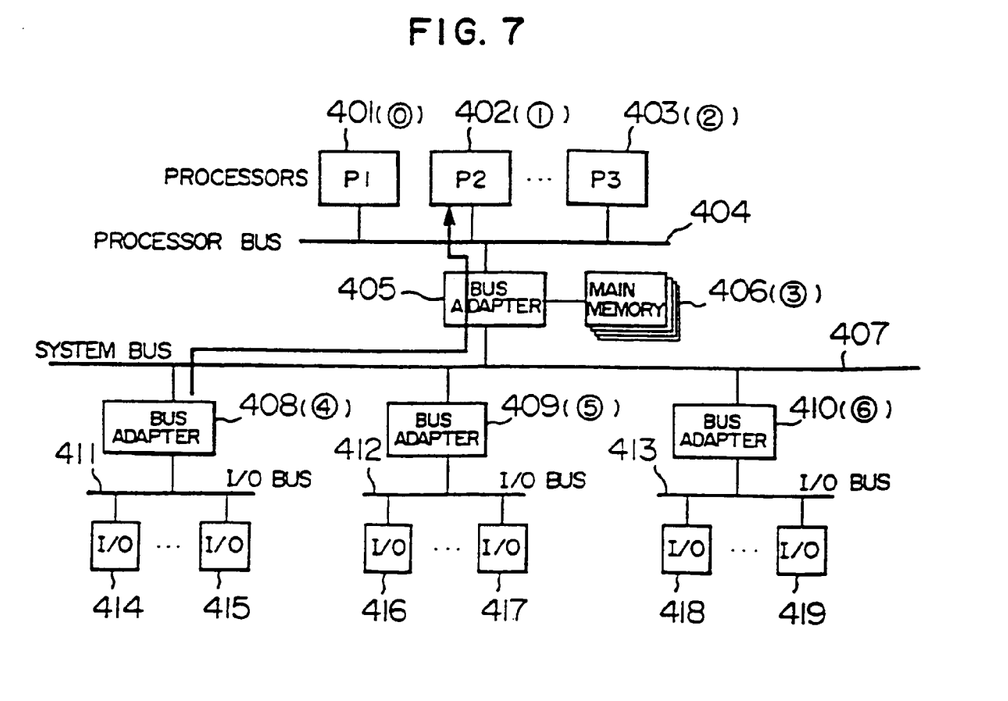

Similarly, the next response data is appropriately sent to the processor P2 by the bus adapter 405 according to the value of the identifier "1" on the line SINKMOD. The flow of response data in this case is as denoted by a solid arrowheaded line in FIG. 7.

Figure 8:
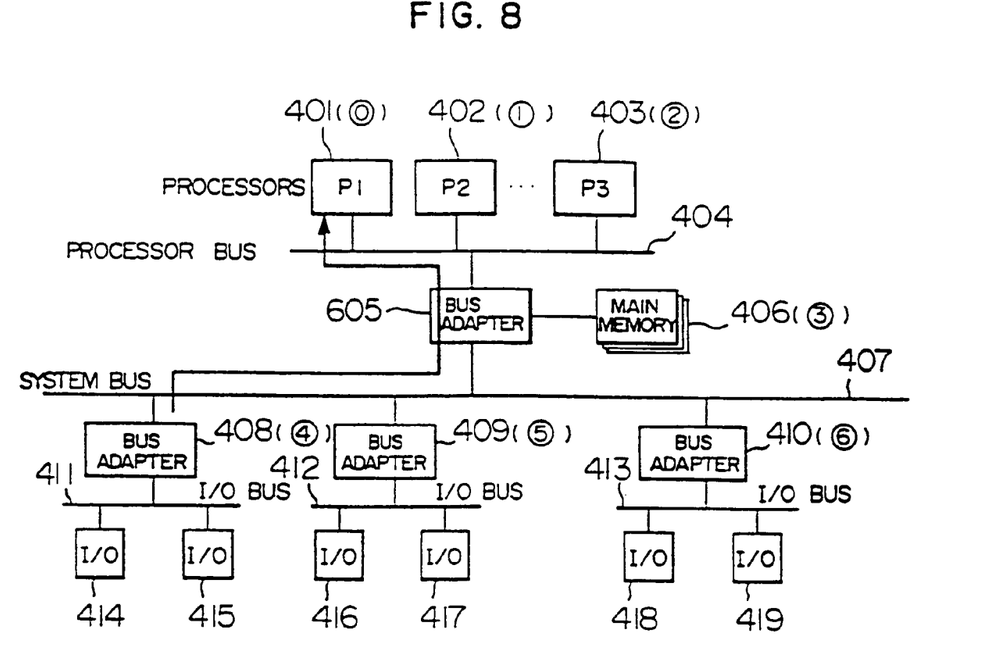

In the similar manner, also the last response data is appropriately sent to the processor PI by the bus adapter 405 according to the value of the identifier "0" on the line SINKMOD. The flow of response data in this case is as designated by a solid arrowheaded line in FIG. 8.

Figure 10:
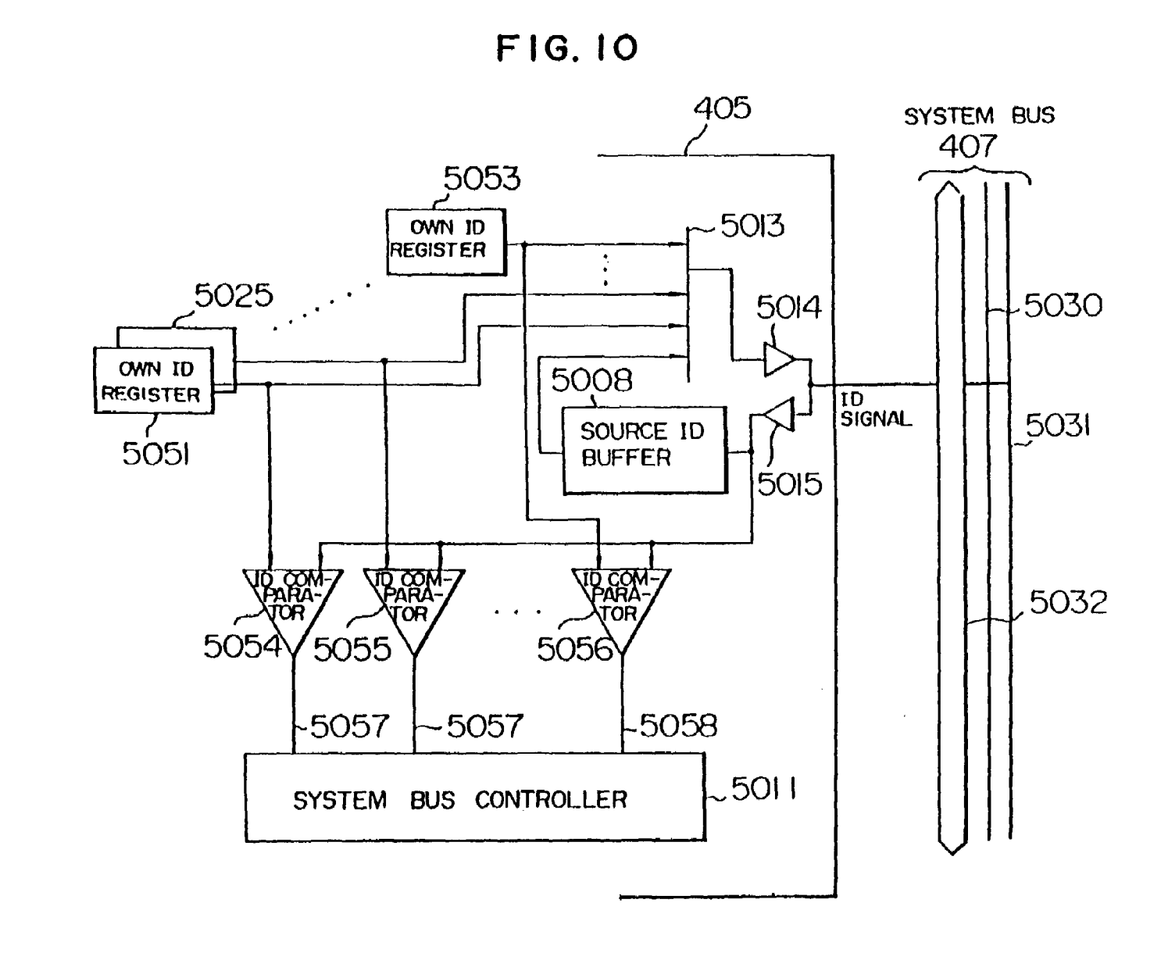
FIG. 10 is a schematic diagram showing an example of the configuration of the bus adapter in the data processing system of FIG. 5.

The bus adapter 405 accomplishing the operation above can be easily implemented by slightly modifying the bus adapter 305 or 308 of FIG. 4. FIG. 10 shows an example of the modified portion of the bus adapter 405. The other portions thereof are substantially identical to those of the bus adapter 305 of FIG. 4 and hence are not shown. In FIG. 10, there are disposed a plurality of own ID registers 5051 to 5053 and ID comparators 5054 to 5058 respectively associated therewith. By assigning identifiers described above to the respective processors connected to the processor bus 404, response data items returned from access destination modules to the adapter 405 can be correctly passed to the processors having issued read request respectively associated with the response data items.

Figure 11:
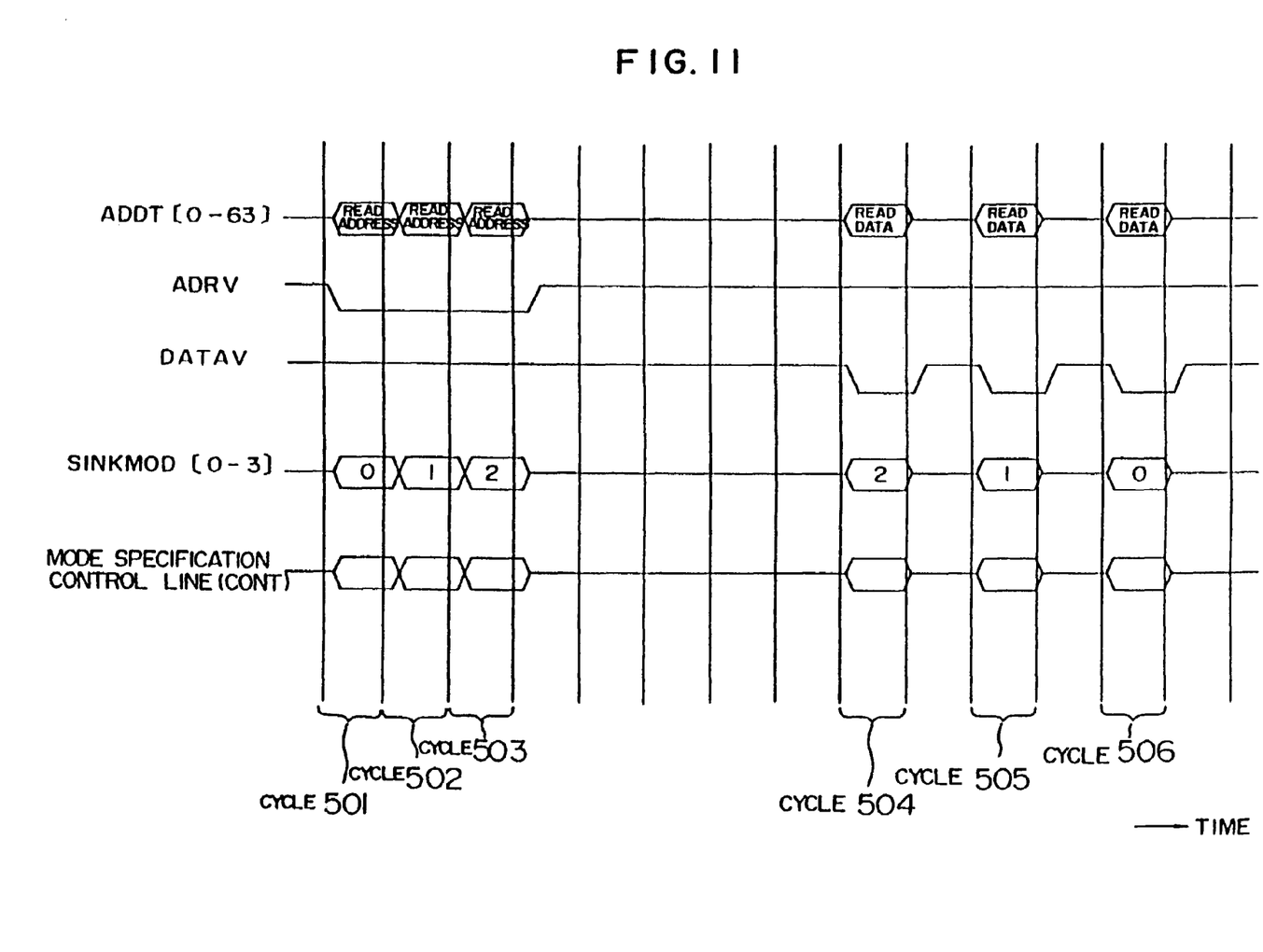
FIG. 11 is a signal timing chart for explaining the bus control operation in the data processing system of FIG. 5.

FIG. 11 is a signal timing chart showing the access operation described by reference to FIGS. 5 to 10.

This diagram is drawn on assumption as follows. A cycle 501 is a start cycle of a read operation, the bus adapter 405 has the bus mastership, and the initiating module (the response destination of the read data) is indicated as "0" (the processor 401 as the source module) on the line SINKMOD. A cycle 502 is a start cycle of a read operation, the bus adapter 405 has the bus mastership, and the initiating module is indicated as "1" (the processor 402 as the source module) on the line SINKMOD. A cycle 503 is a start cycle of a read operation, the bus adapter 405 has the bus mastership, and the initiating module is indicated as "2" (the processor 403 as the source module) on the line SINKMOD.

A cycle 504 is a response cycle of a read operation, the bus adapter 408 has the bus mastership, and the initiating module is indicated as "2" (the processor 403 as the source module) on the line SINKMOD. A cycle 505 is a response cycle of a read operation, the bus adapter 408 has the bus mastership, and the initiating module is indicated as "1" (the processor 402 as the source module) on the line SINKMOD. A cycle 506 is a response cycle of a read operation, the bus adapter 408 has the bus mastership, and the initiating module is indicated as "0" (the processor 401 as the source module) on the line SINKMOD.

Figure 12A:
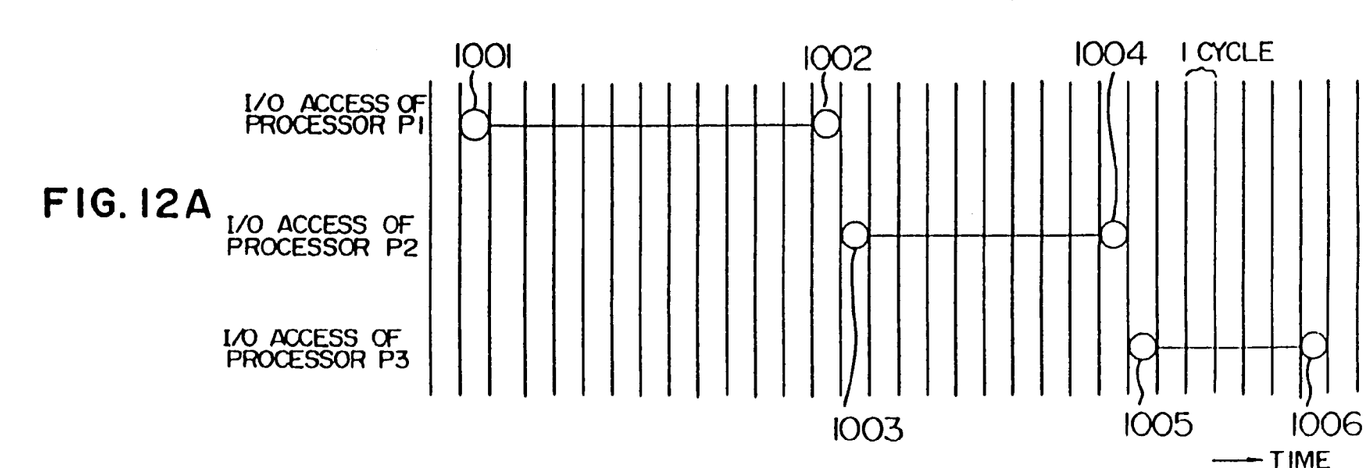
FIGS. 12A and 12B are timing charts useful to explain the difference between the periods of response time for access requests in the data processing system of FIG. 5.
Figure 12B:
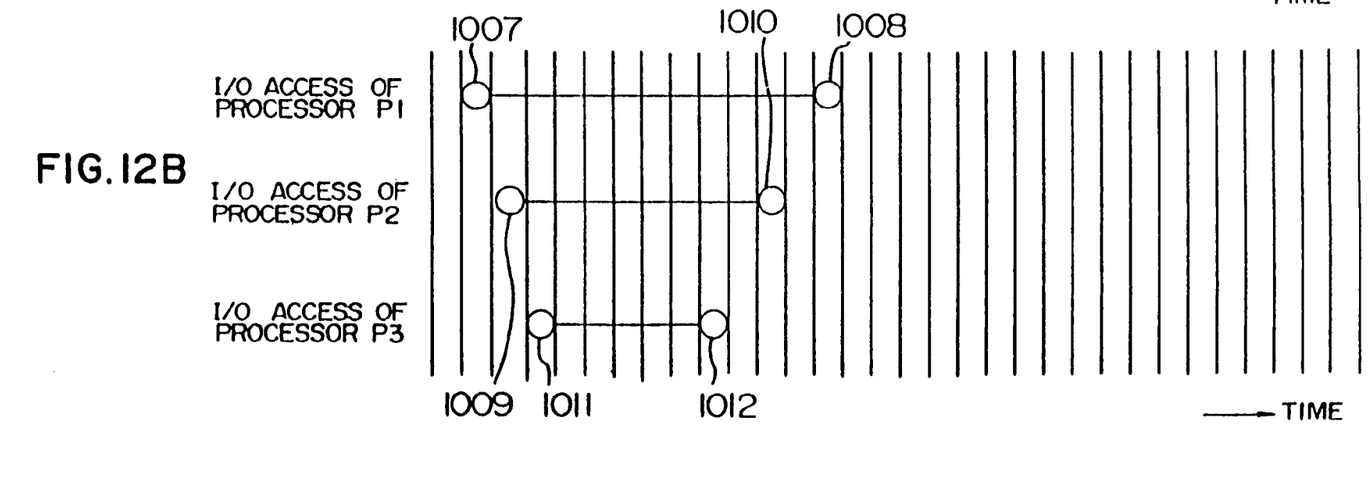

FIGS. 12A and 12B show the difference between the numbers of cycles required at occurrences of conflicts between split read requests in the first and second embodiments according to the present invention.

There are shown in FIGS. 12A and 12B the cycles used according to the protocols of the first and second embodiments, respectively.

Reference numerals 1001 and 1007 denote start cycles of I/O access of the processor P1, numerals 1002 and 1008 stand for response cycles of I/O access of the processor P1, numerals 1003 and 1009 designate start cycles of I/O access of the processor P2, numerals 1004 and 1010 stand for response cycles of I/O access of the processor P2, numerals 1005 and 1011 denote start cycles of I/O access of the processor P3, numerals 1006 and 1012 indicate response cycles of I/O access of the processor P3.

As can be seen from FIG. 12A, when a plurality of read requests are not allowed to be initiated from an identical bus adapter, the read access cycles of the respective requests are used in a sequential manner and hence the periods thereof are added to each other. Namely, a total of 27 cycles are required for the operation. On the other hand, as shown in FIG. 12B, when a plurality of read initiating operations can be effected from an identical bus adapter, only 12 cycles are necessary to achieve the operation and hence the response feature with respect to the read access is further improved.

Figure 9:
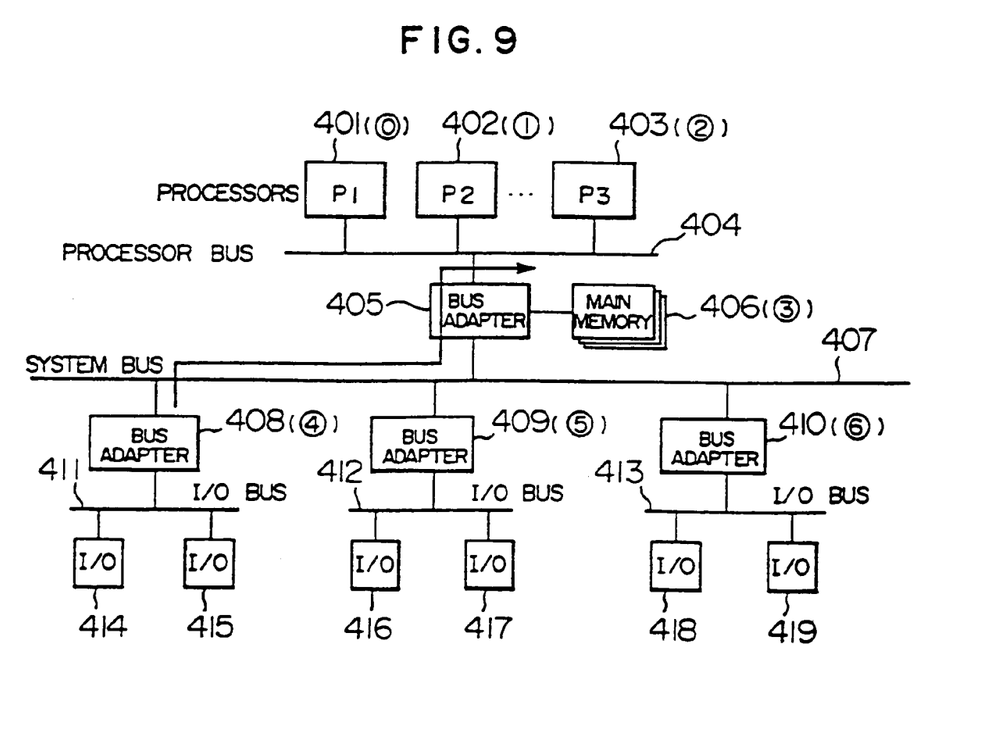

Incidentally, since the main memory 406 is assigned with the identifier "3" as shown in FIG. 9, a direct memory access (DMA) can be easily specified for the main memory.

In this regard, according to the first and second embodiments, the identifier of the module initiating the split read access is transferred via the identifier transfer line SINK- MOD. However, in the third embodiment shown in FIGS. 13 and 14, there is transferred, in addition to the identifier of the source module, an identifier of the destination module of the split read access. With this provision, even for an identical identifier of the source module, the response data can be appropriately returned thereto according to the difference between the identifiers of the respective destination modules.

Figure 13:
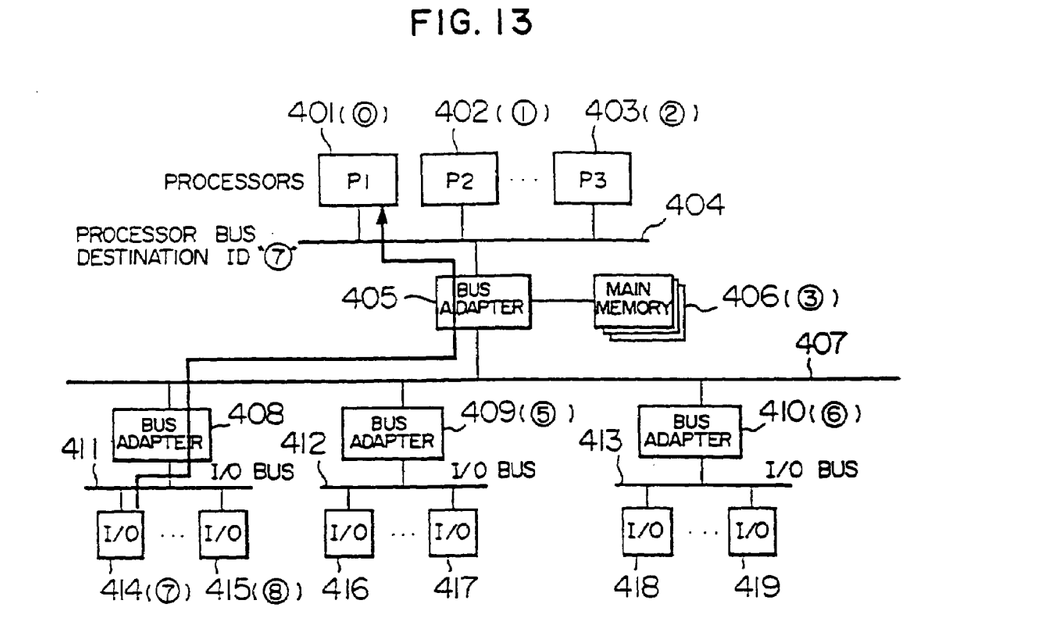
FIGS. 13 and 14 are diagrams respectively showing the configuration and data flows of a data processing system in a third embodiment to which the bus control system is applied according to the present invention.

FIG. 13 is a data flow in which after the processor P1 as a source module initiates a split read operation to the I/O devices 414 and 415 as destination modules, data is returned from the I/O device 414.

Figure 14:
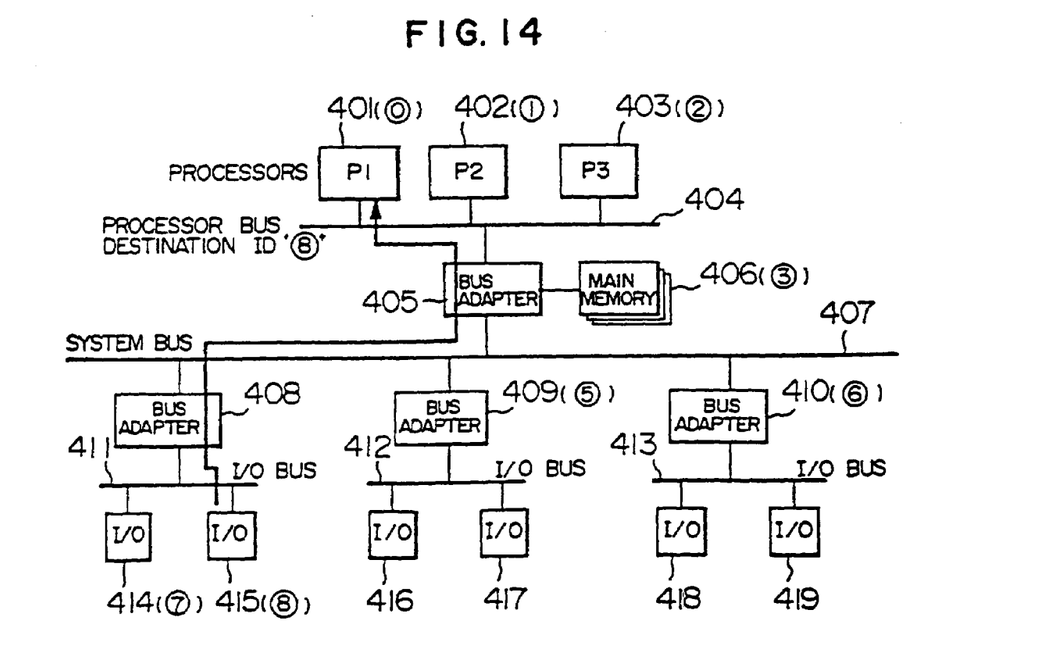

FIG. 14 shows a flow of data thereafter returned from the I/O device 415 to the processor P1. When the identifiers of the destination modules are specified as above, even when access requests are concurrently achieved from an identical source module to mutually different destination modules, response data can be appropriately sent to the source module.

While particular embodiments of the invention have been shown and described, it will be obvious to those skilled in the art that various changes and modifications may be made without departing from the present invention in its broader aspects.

The invention claimed is:

1. An information processing system comprising:
   a processor;
   processor lines coupled to said processor, said processor lines being capable of executing a split transfer protocol;
   a device;
   system lines coupled to said device, said system lines being capable of executing a split transfer protocol; and
   an adapter for said processor lines, and said system lines;
   wherein said processor obtains lines mastership, outputs an access request to said device, and thereafter releases said lines mastership, and said device issues a request for lines mastership when data to be sent to said processor is ready for transmission, acquires said lines mastership requested, and transfers said data to said processor.

2. An information processing system according to claim 1, wherein said device is a first adapter, said first adapter hierarchically coupling said processor lines and said system lines,
   wherein said information processing system further comprises:
   an I/O device; and
   I/O lines coupled to said I/O device; and
   a second adapter hierarchically coupling said system lines and said I/O lines.

3. An information processing system comprising:
   a processor;
   processor lines coupled to said processor, said processor lines being capable of executing a split transfer protocol;
   a device;
   system lines coupled to said device, said system lines being capable of executing a split transfer protocol;
   a main memory;
   memory lines coupled to said main memory; and
   an adapter for said processor lines, and said system lines, and said adapter coupled to said memory lines;
   wherein said processor obtains lines mastership, outputs an access request to said device, and thereafter releases said lines mastership, and said device issues a request for lines mastership when data to be sent to said processor is ready for transmission, acquires said lines mastership requested, and transfers said data to said processor.

4. An information processing system according to claim 3, wherein said device is a first adapter, said first adapter hierarchically coupling said processor lines, and said system lines,
   wherein said information processing system further comprises:
   an I/O device; and
   I/O lines coupled to said I/O device, and
   a second adapter hierarchically coupling said system lines, and said I/O lines.

5. An information processing system comprising:
   a processor;
   processor lines coupled to said processor, said processor lines being capable of executing a split transfer protocol;
   a device;
   system lines coupled to said device, said system lines being capable of executing a split transfer protocol;
   a main memory;
   memory lines coupled to said main memory; and
   an adapter for said processor lines, and said system lines, and said adapter coupled to said memory lines, and said adapter achieving a protocol conversion between said processor lines and said system lines;
   wherein said processor obtains lines mastership, outputs an access request to said device, and thereafter releases said lines mastership, and said device issues a request for lines mastership when data to be sent to said processor is ready for transmission, acquires said lines mastership requested, and transfers said data to said processor.

6. An information processing system according to claim 5, wherein said device is a first adapter, said first adapter hierarchically coupling said processor lines and said system lines,
   wherein said information processing system further comprises:
   an I/O device; and
   I/O lines coupled to said I/O device; and
   a second adapter hierarchically coupling said system lines, and said I/O lines, said second adapter executing protocol conversion between said system lines and said I/O lines.

* * * * *